United States Patent [19]

Hayashi et al.

[11] Patent Number: 4,985,520
[45] Date of Patent: Jan. 15, 1991

[54] FLUOROELASTOMER HAVING EXCELLENT PROCESSABILITY

[75] Inventors: Kenichi Hayashi; Yoshito Matsuoka, both of Nobeoka, Japan

[73] Assignee: Asahi Kasei Kogyo Kabushiki Kaisha, Osaka, Japan

[21] Appl. No.: 382,395

[22] Filed: Jul. 20, 1989

[30] Foreign Application Priority Data

Jul. 29, 1988 [JP] Japan ................. 63-188205

[51] Int. Cl.$^5$ ............................................. C08F 14/18
[52] U.S. Cl. ...................................................... 526/254
[58] Field of Search .......................................... 526/254

[56] References Cited

U.S. PATENT DOCUMENTS

| | | |
|---|---|---|
| 2,968,649 | 1/1961 | Pailthorp et al. |
| 3,051,677 | 8/1962 | Rexford. |
| 3,801,524 | 4/1974 | Kometani et al. |
| 3,839,305 | 10/1974 | Moore. |
| 3,845,024 | 10/1974 | Weaver. |
| 4,027,086 | 5/1977 | Lo Valvo et al. |
| 4,123,603 | 10/1978 | Stewart, Jr. |
| 4,141,874 | 2/1979 | Oka et al. |
| 4,243,770 | 1/1981 | Tatemoto et al. |
| 4,251,399 | 2/1981 | Tomoda et al. |
| 4,501,869 | 2/1985 | Tatemoto et al. |
| 4,690,994 | 9/1987 | Masuda et al. ............ 526/254 |
| 4,708,988 | 11/1987 | Tabb ........................ 526/254 |
| 4,739,024 | 4/1988 | Moggi et al. ............. 526/254 |
| 4,830,920 | 5/1989 | Hayashi et al. ........... 526/254 |

FOREIGN PATENT DOCUMENTS

| | | | |
|---|---|---|---|
| 772162 | 1/1972 | Belgium ...................... | 526/254 |
| 0186180 | 7/1986 | European Pat. Off. | |
| 337394 | 4/1970 | Japan. | |
| 48-18957 | 6/1973 | Japan. | |
| 52-46998 | 11/1977 | Japan. | |
| 365893 | 5/1984 | Japan. | |
| 62-59611 | 3/1987 | Japan. | |
| 62-112611 | 5/1987 | Japan ......................... | 526/254 |
| 63-59405 | 11/1988 | Japan. | |
| 950084 | 2/1964 | United Kingdom ........ | 526/254 |

Primary Examiner—Joseph L. Schofer
Assistant Examiner—N. Sarofin
Attorney, Agent, or Firm—Birch, Stewart, Kolasch & Birch

[57] ABSTRACT

A fluoroelastomer is disclosed which comprises vinylidene fluoride units and hexafluoropropylene units, optionally together with tetrafluoroethylene units, and wherein the amount of tetrafluoroethylene units is 35 to 0% by weight and the weight ratio of vinylidene fluoride units to hexafluoropropylene units is in the range of 80:20 to 40:60. The fluoroelastomer has a relatively low limiting viscosity number and a specific molecular weight distribution. The fluoroelastomer has excellent processability, e.g., excellent roll processability, mold release characteristics and metal-adhesion properties, and is capable of providing a vulcanized rubber having excellent mechanical strength and compression set resistance. The vulcanized rubber is advantageous in the manufacture of O-rings, oil seals, packings, gaskets, diaphragm materials and the like.

5 Claims, 4 Drawing Sheets

FLUOROELASTOMER HAVING EXCELLENT PROCESSABILITY

BACKGROUND OF THE INVENTION

1. Field of the Invention

The present invention relates to a novel fluoroelastomer having excellent processability and a vulcanized rubber obtained therefrom. More particularly, the present invention is concerned with a fluoroelastomer comprising vinylidene fluoride units and hexafluoropropylene units, optionally together with tetrafluoroethylene units, in specific proportions and having a relatively low limiting viscosity number and a specific molecular weight distribution, and a vulcanized rubber obtained therefrom. The fluoroelastomer has excellent processability during the vulcanization-molding procedure, particularly excellent roll processability, mold release characteristics and metal-adhesion properties, and a vulcanized rubber obtained therefrom has extremely excellent mechanical strength and compression set resistance.

2. Discussion Of Related Art

In general, fluoroelastomers have excellent resistance to heat, solvent and chemicals and, therefore, have been useful in the manufacture of sealant materials which are subject to being employed under stringent conditions. Examples of such materials are O-rings, oil seals, packings and gaskets; diaphragm materials and the like. In recent years, mechanical parts have more frequently become smaller in size and sophisticated in shape and, accordingly, fluoroelastomers are now required to have improved processability, mechanical strength, compression set resistance and the like.

Heretofore, various compositions have been proposed with respect to a fluoroelastomer. For example, a fluoroelastomer was proposed, which is obtained by copolymerizing 60 to 15 % by weight of vinylidene fluoride (hereinafter often referred to as "VdF") with 40 to 85 % by weight of hexafluoropropylene (hereinafter often referred to as "HFP") (see Japanese Patent Application Publication Specification No. 33-7394). Another type of fluoroelastomer is disclosed in U.S. Patent No. 2,968,649, which contains VdF, HFP and 3 to 35% by weight of tetrafluoroethylene (hereinafter often referred to as "TFE") units and wherein the total amount of VdF units and HFP units is 97 to 65 % by weight and the weight ratio of VdF units to HFP units is in the range of from 2.33:1 to 0.667:1. Still another type of fluoroelastomer is disclosed in Japanese Patent Application Publication Specification No. 48-18957, which contains VdF, HFP and 10 to 30 % by weight of TFE units and wherein the total amount of VdF units and HFP units is 90 to 70 % by weight and the weight ratio of VdF units to HFP units is in the range of from 1.6:1.0 to 4.0:1.0. Still another type of fluoroelastomer is disclosed in U.S. Patent No. 4,123,603, which comprises 57 to 61 % by weight of VdF units, 27 to 31 % by weight of HFP units and 10 to 14 % by weight of TFE units.

Fluoroelastomers are generally subjected to a primary vulcanization using a mold and to a secondary vulcanization in an oven to obtain a shaped article. However, conventional fluoroelastomers have drawbacks in that the mold release characteristics are likely to become poor after the primary vulcanization and, therefore, portions of the fluoroelastomer are likely to be torn off and left on the surface of the mold, leading to an increase in the ratio of defectives. On the other hand, fluoroelastomers are required to have good metal-adhesion properties during the vulcanization-molding. That is, when a shaped, composite rubber article comprising a vulcanized fluoroelastomer and a metal component unified therewith is intended to be produced, the fluoroelastomer is required to firmly adhere to the metal component by means of the vulcanization-molding treatment. Therefore, fluoroelastomers having not only good mold release characteristics but also good metal-adhesion properties within the vulcanization-molding procedure, even though the two are incompatible with each other, are strongly desired.

In vulcanizing a large quantity of fluoroelastomer by kneading, for example, by the use of a Banbury mixer, fluoroelastomers having a relatively low molecular weight are generally used. However, this is disadvantageous in that the resultant vulcanized, shaped rubber articles are likely to have poor mechanical strength and compression set resistance. Further, there is also a problem in that such low molecular weight fluoroelastomers have poor mold release characteristics and, therefore, portions of fluoroelastomer are likely to be torn off and left on the surface of a mold. For overcoming the above-mentioned problems, it was proposed to add to a fluoroelastomer a vulcanization accelerator, such as a phosphonate, before kneading (see Japanese Patent Application Laid-Open Specification No. 62-54750). However, the above-mentioned problems have not been satisfactorily overcome by simply adding a vulcanization accelerator. Up to the present time, no method has been proposed which is capable of satisfactorily solving the above-mentioned problems.

On the other hand, with respect to the production of a two-component fluoroelastomer consisting of VdF units and HFP units, various techniques using emulsion polymerization are known, which include those disclosed in Japanese Patent Application Publication Specification No. 36-5893 and U.S. Pat. Nos. 3,051,677, 3,056,767, 3,069,401 and No. 3,194,796.

Moreover, proposals have been made in order for a fluoroelastomer to have a specific composition (see, for example, U.S. Pat. No. 4,027,086). Also, a method has been proposed for producing a blend of a fluoroelastomer and a fluororesin, which consists in first obtaining a fluoroelastomer by emulsion polymerization and subsequently obtaining a fluororesin by emulsion polymerization to thereby obtain a blend thereof (see, for example, U.S. Pat. No. 3,929,934).

On the other hand, various proposals have been made concerning the regulation of the molecular weight distribution of a fluoroelastomer. For example, there have been proposed a method for producing a copolymer having a bimodal molecular weight distribution by a two-step emulsion polymerization process (continuous polymerization), wherein polymerization is first effected for forming a high molecular weight copolymer and subsequently for forming a low molecular weight copolymer (see U.S. Pat. Nos. 3,839,305 and 3,845,024); a method for producing a copolymer or terpolymer having a low Mooney viscosity and excellent processability, in which suspension polymerization is performed (see U.S. Pat. No. 3,801,552; a method for regulating the molecular weight distribution of a fluoroelastomer by the use of a chain transfer agent (see Japanese Patent Application Publication Specification No. 52-46998); a method for producing a fluoroelastomer having a predetermined molecular weight distribution, in which suspension polymerization is performed while portion-wise adding a polymerization catalyst (see Japanese Patent Application Laid-Open Specification No. 62-59611); a method for producing a fluoroelastomer having a bimodal molecular weight distribution, in which suspension polymerization is performed under a relatively high pressure (see European Patent Application Publication No. 0186180 A2); and a method for producing a fluoroelastomer having a predetermined molecular weight distribution, in which suspension polymerization is performed under a relatively low pressure (see Japanese Patent Application Laid-Open Specification No. 62-112611).

Moreover, the following two-step emulsion polymerization was proposed. In U.S. Pat. No. 4,141,874, it was proposed to employ a method in which a water-soluble radical initiator is first used and an oil-soluble radical initiator is subsequently used. Further, in U.S. Pat. No. 3,801,552, it was proposed to employ a method for producing a fluoroelastomer, which comprises performing polymerization under ionizing radiation so as to obtain a fluoroelastomer having a low Mooney viscosity and excellent processability.

As described above, a wide variety of fluoroelastomers are known, which can be produced by a number of methods. However, a fluoroelastomer which is satisfactory in all of the desired properties, such as melt flowability, moldability, metal mold-caused staining resistance, mold release characteristics, metal-adhesion properties and capability of providing a vulcanized, shaped rubber article having excellent compression set resistance and mechanical strength, is not known. In fact, all the prior art fluoroelastomers do not satisfy simultaneously both the apparently incompatible different properties, that is, excellent processability and capability of providing a vulcanized, shaped rubber article having excellent mechanical properties.

SUMMARY OF THE INVENTION

In the current situation as described above, the present inventors have conducted extensive and intensive studies relating to the development of a fluoroelastomer having an excellent balance of processability and capability of providing a vulcanized rubber having excellent mechanical properties. As a result, it has been found that a fluoroelastomer comprising VdF units and HFP units or comprising VdF units, HFP units and TFE units in specific proportions, which fluoroelastomer has a specific limiting viscosity number and a specific molecular weight distribution, exhibits an excellent balance of processability and capability of providing a vulcanized rubber having excellent mechanical properties. The present invention has been made, based on this novel finding.

Accordingly, it is an object of the present invention to provide a novel fluoroelastomer which is satisfactory in all of the desired properties, such as melt flowability, moldability, metal mold-caused staining resistance, mold release characteristics, metal-adhesion properties and capability of providing a vulcanized rubber having excellent compression set resistance and mechanical strength.

The foregoing and other objects, features and advantages of the present invention will be apparent from the following detailed description and appended claims taken in connection with the accompanying drawings.

DETAILED DESCRIPTION OF THE INVENTION

Figure 1:
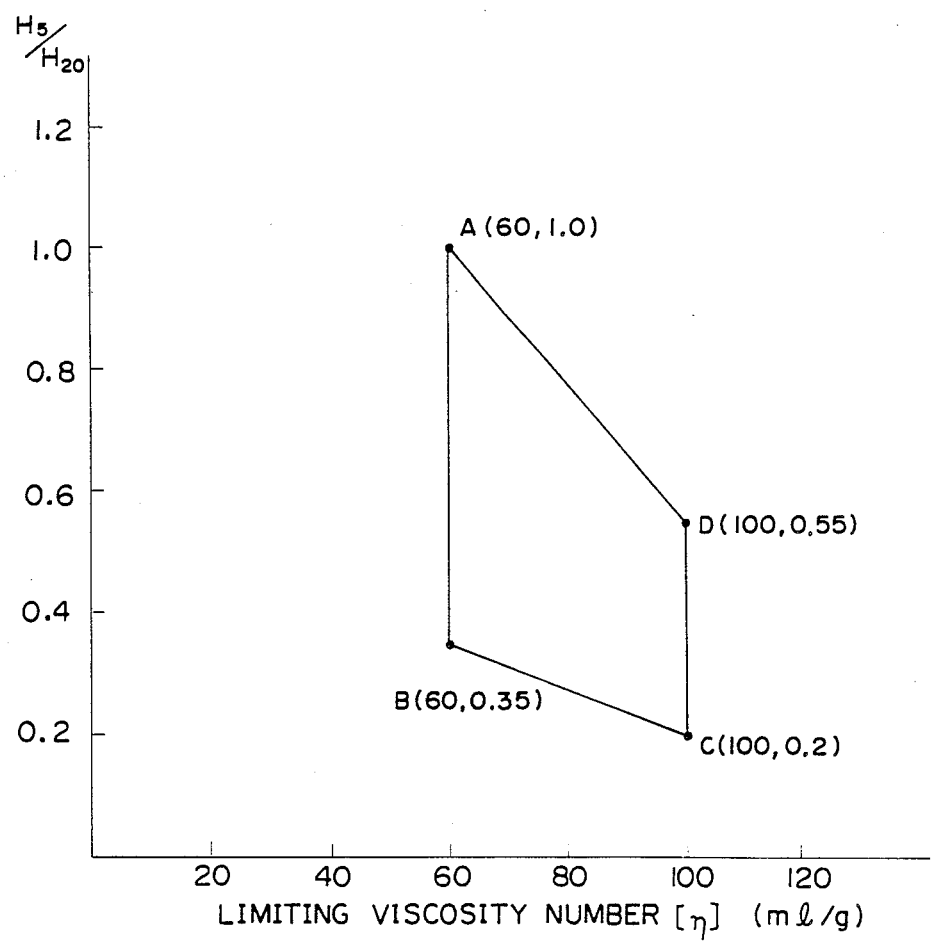
FIG. 1 is a graph showing the region of the present invention, which is defined by the limiting viscosity number [$\eta$] and the ratio of $H_5$ to $H_{20}$ wherein $H_5$ and $H_{20}$ respectively represent the heights at molecular weights of 50,000 and 200,000 of the molecular weight distribution curve obtained by gel permeation chromatography.

Essentially, according to the present invention, there is provided a fluoroelastomer comprising vinylidene fluoride units, hexafluoropropylene units and 35 to 0 % by weight, based on the weight of the elastomer, of tetrafluoroethylene units. The total of the vinylidene fluoride units and the hexafluoropropylene units is 65 to 100 % by weight based on the weight of the elastomer. The weight ratio of the vinylidene fluoride units to the hexafluoropropylene units is in the range of 80:20 to 40:60. In the fluoroelastomer of the present invention:

(a) the limiting viscosity number (ml/g) of the elastomer is in the range of from 60 to 100, (b) the ratio of the weight average molecular weight ($\overline{M}w$) of the elastomer to the number average molecular weight ($\overline{M}n$) of the elastomer is in the range of from 2 to 4, and (c) the limiting viscosity number of the elastomer and the ratio of $H_5$ to $H_{20}$ of the elastomer, wherein $H_5$ and $H_{20}$ respectively represent the heights at molecular weights of 50,000 and 200,000 of the molecular weight distribution curve obtained by gel permeation chromatography, satisfy a requirement such that a point defined by the limiting viscosity number and the $H_5/H_{20}$ ratio in the rectangular coordinates where the limiting viscosity number is an abscissa and the $H_5/H_{20}$ ratio is an ordinate, is within the region defined by the quadrilateral formed by successively connecting points A(60, 1.0), B(60, 0.35), C(100, 0.2) and D(100,0.55) in the coordinates.

The fluoroelastomer of the present invention includes a binary copolymer comprising VdF units and HFP units, and also includes a terpolymer comprising VdF units, HFP units and TFE units.

The fluoroelastomer of the present invention has a specific limiting viscosity number, i.e., a specific molecular weight and has a specific molecular weight distribution.

Generally, when a fluoroelastomer contains low molecular weight components in a large amount, the fluoroelastomer can easily be kneaded together with a vulcanizer and molded, and also has metal-adhesion properties which are advantageous for obtaining a shaped, composite rubber article comprising a vulcanized fluoroelastomer and a metal component unified therewith. However, such a fluoroelastomer is disadvantageous in that not only are the mold release characteristics in the vulcanization-molding likely to be poor, but also the molded rubber article is likely to have low mechanical strength and poor compression set resistance. On the other hand, when a fluoroelastomer contains low molecular weight components in a small amount, tendencies are observed which are inverse to those in the case where a fluoroelastomer contains low molecular weight components in a large amount. In other words, with respect to the conventional fluoroelastomer, processability is incompatible with capability of providing a vulcanized, shaped rubber article having excellent mechanical properties, such as high mechanical strength and excellent compression set resistance. That is, there has been a technical dilemma. However, a fluoroelastomer having both excellent processability and capability of providing a vulcanized, shaped rubber article having excellent mechanical properties is unexpectedly provided according to the present invention. In the present invention, the limiting viscosity number [$\theta$] of the fluoroelastomer and the ratio of $H_5$ to $H_{20}$ of the fluoroelastomer, wherein $H_5$ and $H_{20}$ respectively represent the heights at molecular weights of 50,000 and 200,000 of the molecular weight distribution curve obtained by gel permeation chromatography, are controlled so as to satisfy a requirement such that a point defined by the limiting viscosity number and the $H_5/H_{20}$ ratio in the rectangular coordinates where the limiting viscosity number is an abscissa and the $H_5/H_{20}$ ratio is an ordinate, is within the region defined by the quadrilateral formed by successively connecting points A(60, 1.0), B(60, 0.35), C(100, 0.2) and D(100,0.55) in the coordinates. Thus, the long-standing difficulties due to the above-mentioned technical dilemma have been completely obviated.

The fluoroelastomer of the present invention has a limiting viscosity number [$\theta$], which is an index of a molecular weight, of 60 to 100 ml/g, preferably 70 to 100 ml/g. When the limiting viscosity number [$\theta$] of the fluoroelastomer is less than 60 ml/g (which means that the fluoroelastomer contains low molecular weight components in too large an amount), the fluoroelastomer is likely to adhere to rolls, so that the mold release characteristics are likely to be poor. Further, the mechanical strength and compression set resistance of a molded article obtained from the fluoroelastomer are also likely to be poor. On the other hand, when the limiting viscosity number [$\theta$] exceeds 100 ml/g, the processability, such as sheet-forming properties of a fluoroelastomer, are likely to be poor. Further, when the fluoroelastomer has too high a fluorine content, the sheet-forming properties become disadvantageously poor. In fact, when the fluoroelastomer has a high molecular weight and a high fluorine content, it is difficult to produce a sheet having a large thickness, because sufficient pressure cannot be exerted at the inner portion of the sheet when pressed by rolls so that cracks are likely to be formed in the sheet.

In the fluoroelastomer of the present invention, the ratio of the weight average molecular weight ($\overline{M}w$) to the number average molecular weight ($\overline{M}n$), i.e., $\overline{M}w/\overline{M}n$ ratio, which is an index of the molecular weight distribution, is in the range of from 2 to 4. When the $\overline{M}w/\overline{M}n$ ratio exceeds 4, the molecular weight distribution of the fluoroelastomer is too broad. In other words, the fluoroelastomer contains both low molecular weight components and high molecular weight components in relatively large amounts. When a fluoroelastomer contains low molecular weight components in a relatively large amount, the mechanical properties of the molded rubber article obtained from the fluoroelastomer are likely to be poor, although the processability of the fluoroelastomer is good. On the other hand, when a fluoroelastomer contains high molecular weight components in a relatively large amount, there are tendencies which are inverse to those in the case where a fluoroelastomer contains low molecular weight components in a relatively large amount. As a result, the fluoroelastomer cannot simultaneously have both excellent processability and excellent capability of producing a vulcanized, shaped rubber article having excellent mechanical properties. On the other hand, it is extremely difficult to actually produce a fluoroelastomer having an $\overline{M}w/\overline{M}n$ ratio of less than 2. That is, it is very difficult to produce a fluoroelastomer having such a narrow molecular weight distribution by customary radical polymerization.

In view of the mode in which the molecular weight distribution of the fluoroelastomer of the present invention is formed, the molecular weight distribution curve of the fluoroelastomer has a bimodal configuration having a peak in a high molecular weight region and another peak in a low molecular weight region. However, the fluoroelastomer having a limiting viscosity number in the range defined by the present invention, exhibits a molecular weight distribution of substantially monomodal configuration in which both the peaks partially overlap with each other.

In the present invention, the ratio of $H_5$ to $H_{20}$ of the fluoroelastomer is critical wherein $H_5$ and $H_{20}$ respectively represent the heights at molecular weights of 50,000 and 200,000 of the molecular weight distribution curve obtained by gel permeation chromatography. The heights, $H_5$ and $H_{20}$, are, respectively, defined as the heights of the vertical lines drawn from the base line at points corresponding to molecular weights of 50,000 and 200,000 to the curve. The height $H_5$ at a molecular weight of 50,000 of the molecular weight distribution curve is an index of the content of low molecular weight components in a fluoroelastomer, which components contribute to an excellent processability of the fluoroelastomer but adversely affect the mechanical properties of a vulcanized fluoroelastomer. On the other hand, the height $H_{20}$ at a molecular weight of 200,000 of the molecular weight distribution curve is an index of the content of high molecular weight components in a fluoroelastomer, which components contribute to excellent mechanical properties of a vulcanized fluoroelastomer.

In the present invention, as shown in FIG. 1, the limiting viscosity number [$\theta$] of the fluoroelastomer and the $H_5/H_{20}$ ratio satisfy a requirement such that a point defined by the limiting viscosity number and the $H_5/H_{20}$ ratio in the rectangular coordinates where the limiting viscosity number is an abscissa and the $H_5/H_{20}$ ratio is an ordinate, is within the region defined by the quadrilateral formed by successively connecting points A(60, 1.0), B(60, 0.35), C(100, 0.2) and D(100, 0.55), preferably A'(60, 0.90), B'(60, 0.45), C'(100, 0.33) and D'(100, 0.55) in the coordinates.

In FIG. 1, when a point defined by the limiting viscosity number and the $H_5/H_{20}$ ratio is above the straight line connecting points A and D, the $H_5/H_{20}$ ratio is too large, i.e., the content of low molecular weight components in a fluoroelastomer is too high. This leads to a poor processability, e.g., occurrences of undesired adherence of a fluoroelastomer to rolls, tearing off of portions of the fluoroelastomer and adherence of the torn off portions onto the surface of a mold and difficulty in release from a mold are observed. Further, the mechanical strength and compression set resistance of a vulcanized rubber of the fluoroelastomer are likely to be poor. On the other hand, when a point defined by the limiting viscosity number and the $H_5/H_{20}$ ratio is below the straight line connecting points B and C, the $H_5/H_{20}$ ratio is too small. It is actually very difficult to produce a fluoroelastomer having such a small $H_5/H_{20}$ ratio, i.e., a fluoroelastomer having a narrow molecular weight distribution, by customary polymerization techniques. The relationship between the limiting viscosity number and the $H_5/H_{20}$ ratio can be controlled by changing polymerization conditions, such as polymerization pressure, amount of a catalyst, polymerization temperature and the like.

The fluoroelastomer of the present invention has excellent mold release characteristics without the problem of having portions of the fluoroelastomer being torn off and being adhered onto the surface of a mold. It also has excellent metal-adhesion properties with respect to a vulcanized, composite rubber article comprising a vulcanized fluoroelastomer and a metal component unified therewith. In producing such a composite rubber article, the metal component is coated with a primer (adhesive), such as silicone or epoxy resin, and then baked. A composite material of the so treated metal component and the fluoroelastomer is subjected to molding while being vulcanized, to obtain the desired vulcanized, composite rubber article. However, the conventional fluoroelastomer has not sufficient metal-adhesion properties. Both the above-mentioned excellent properties can be attained only by satisfying a requirement such that the limiting viscosity number [$\theta$] and the $H_5/H_{20}$ ratio of the fluoroelastomer be within the specific region defined by the quadrilateral formed by successively connecting points A, B, C and D in the rectangular coordinates of FIG. 1.

The terminal group of the fluoroelastomer affects the vulcanizing properties thereof. Further, the polarity of the terminal group contributes to the improvement of a balance of the mold release characteristics and the metal-adhesion properties of the fluoroelastomer.

Figure 2:
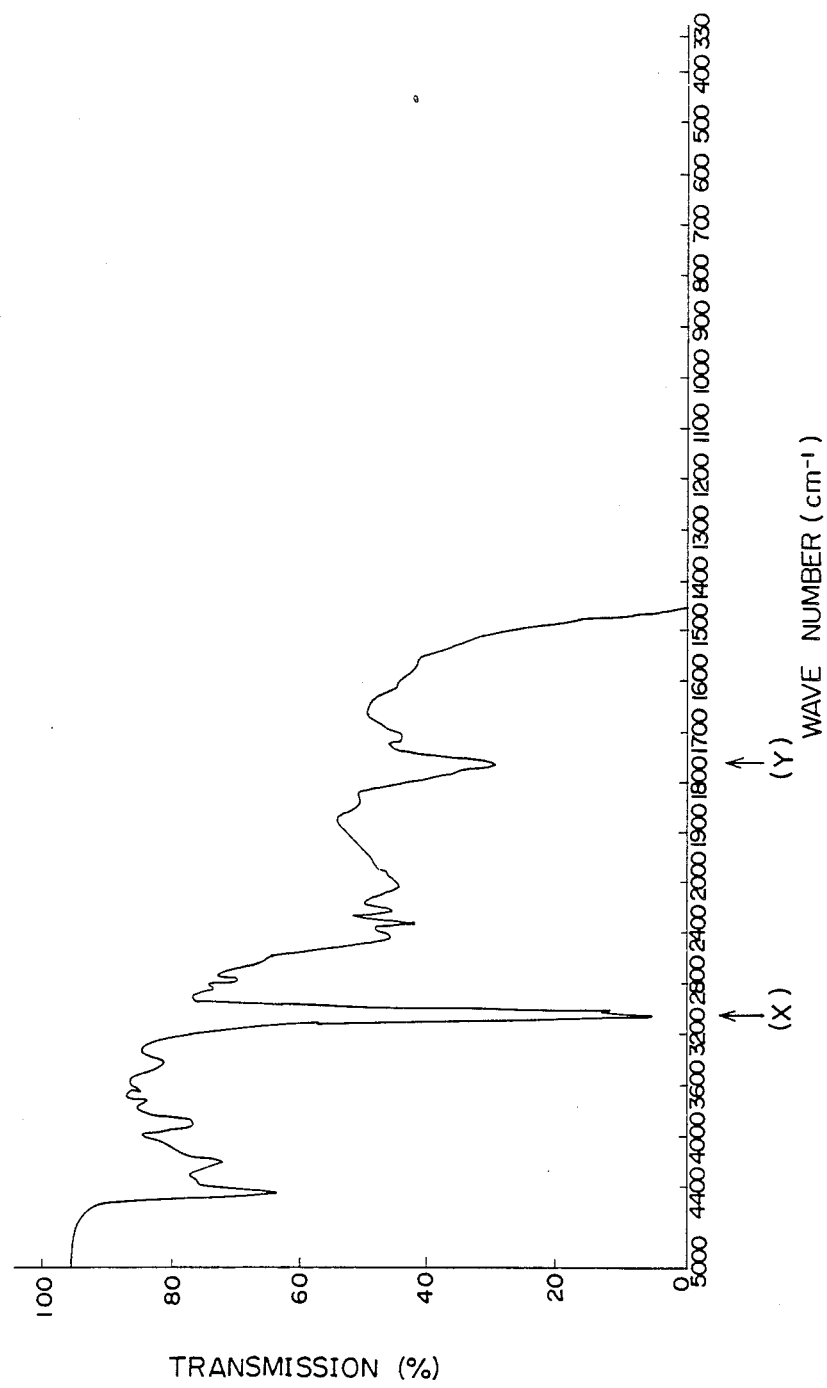
FIGS. 2 and 3 are, respectively, the IR spectra of the fluoroelastomers obtained in Example 1 and in Comparative Example 2.

In a preferred form of the fluoroelastomer of the present invention, the infrared absorption spectrum exhibits major absorbance peaks at 1,720 cm$^{-1}$, 1,760 cm$^{-1}$ and 1,800 cm$^{-1}$, as is seen in FIG. 2. These peaks have relationships with the molecular weight of the fluoroelastomer, suggesting that these peaks are ascribed to the terminal groups of the fluoroelastomer. It is believed that, among these absorbances, the absorbance at 1,760 cm$^{-1}$ is ascribed to the stretching vibration of the carbonyl group in carbonyl group-containing terminal groups derived from the carbonate catalyst used, as described later. The infrared absorption spectrum further exhibits an absorbance at 3,050 cm$^{-1}$ which is ascribed to the $CH_2$ group of the VdF unit. Therefore, the ratio of the absorbance (Y) at a wave number of 1,760 cm$^{-1}$ to the absorbance (X) at a wave number of 3,050 cm$^{-1}$ (hereinafter referred to as "(Y)/(X) ratio") represents the amount of the carbonyl group-containing terminal groups per unit of the VdF. The proportion of the VdF units varies according to the type of the polymer, and the (Y)/(X) ratio varies according to the proportion of the VdF units. Therefore, the (Y)/(X) ratio is not necessarily an accurate index for identifying the amount of the carbonyl group-containing terminal groups of the polymer. However, from a practical viewpoint, this ratio is most useful for determining the amount of the carbonyl group-containing terminal groups of the polymer.

The optimum range of the (Y)/(X) ratio varies depending on the limiting viscosity number [$\theta$], but is generally within the range of 0.04 to 0.40. The fluoroelastomer of the present invention having the (Y)/(X) ratio in the above-mentioned range is excellent not only in mold release characteristics when an article obtained from the fluoroelastomer is released from a metal mold, but also in metal-adhesion properties when production of a composite, vulcanized rubber article comprising a vulcanized fluoroelastomer and a metal component unified therewith is intended. This is due to the high polarity of the carbonyl group-containing functional terminal group of the fluoroelastomer. That is, it is believed that since the functional terminal group of the fluoroelastomer of the present invention has a high polarity (which means that the affinity of the fluoroelastomer to a metal is excellent) and the functional group is also reactive, the metal-adhesion properties are improved. When the (Y)/(X) ratio is less than 0.04, the metal-adhesion properties are poor, because the amount of functional groups is small. When the (Y)/(X) ratio is more than 0.40, the mold release characteristics are likely to be lowered.

When the fluoroelastomer is a terpolymer con-comprising VdF units, HFP units and TFE units, it is preferred that the (Y)/(X) ratio be in the range of from 0.04 to 0.25. When the fluoroelastomer is a binary copolymer comprising VdF units and HFP units, it is preferred that the (Y)/(X) ratio be in the range of 0.10 to 0.40.

Figure 3:
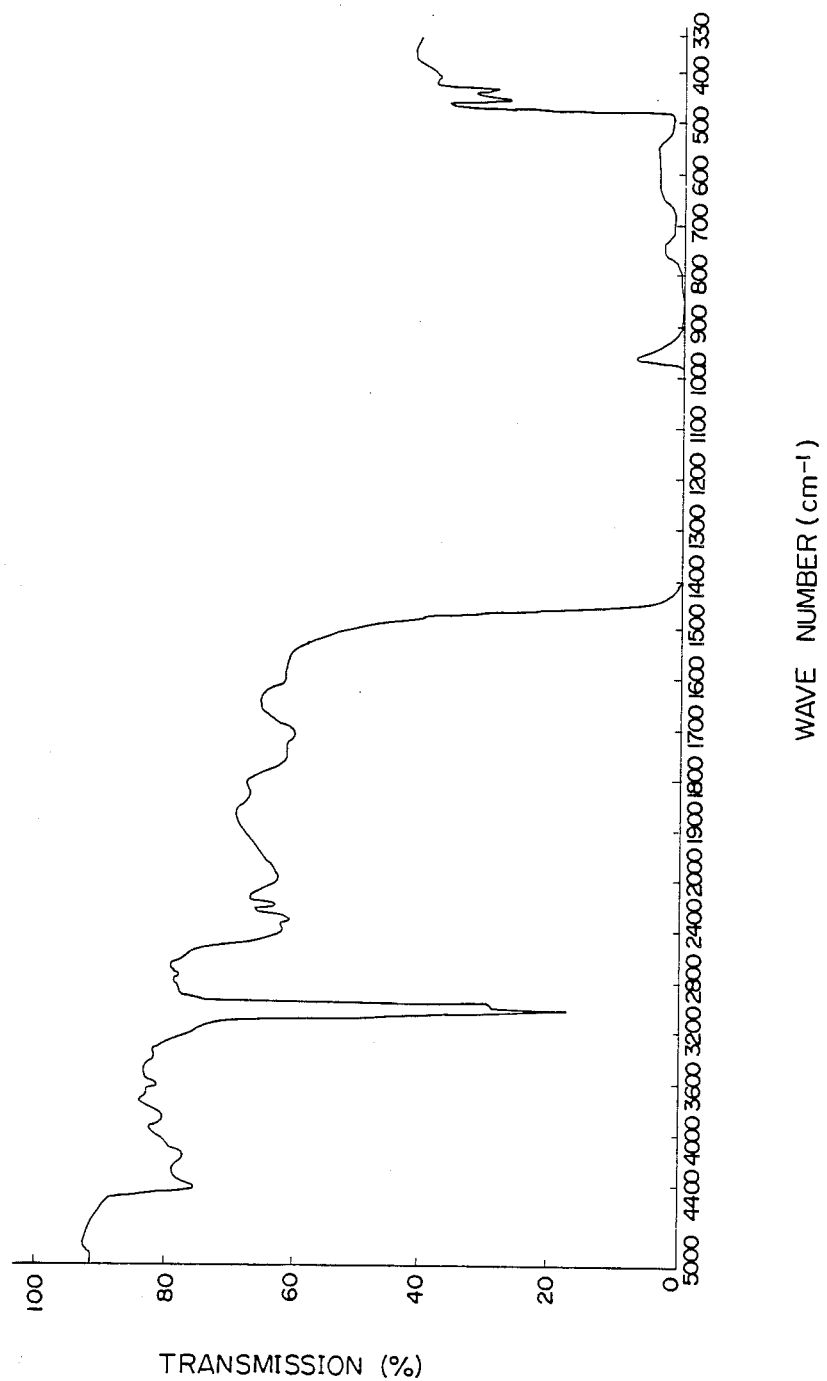

As is seen from FIG. 3, the infrared spectrum of the fluoroelastomer obtained in Comparative Example 2 which is a binary copolymer of VdF and HFP, exhibits a (Y)/(X) ratio as small as less than 0.059.

The fluoroelastomer of the present invention is produced generally by using a dialkyl peroxydicarbonate as a catalyst for polymerization. Therefore, it is believed that the fluoroelastomer has highly polar carbonyl group-containing terminal groups derived from the carbonate as the catalyst. In the present invention, the highly polar terminal groups and the specific relationship characteristics between the limiting viscosity number and the $H_5/H_{20}$ ratio surprisingly synergistically further improve both the mold release characteristics and metal-adhesion properties of the fluoroelastomer which are apparently incompatible with each other.

From the viewpoint of the stable maintenance of the terminal group which has a favorable effect on the metal-adhesion properties, it is preferred that the regulation of the molecular weight of the fluoroelastomer be conducted by controlling the monomer concentration and the amount of the catalyst, rather than by using a chain transfer agent. This is because on the chain transfer agent generally contains a mobile atom, such as a hydrogen atom, an iodine atom, a bromine atom or the like and the mobile atoms is likely to disadvantageously act on the structure of the terminal group to thereby change the structure.

As described above, the fluoroelastomer of the present invention is a binary copolymer comprising VdF units and HFP units, or a terpolymer comprising VdF units, HFP units and TFE units. In the fluoroelastomer of the present invention, the weight proportion of vinylidene fluoride units to hexafluoropropylene units is in the range of 80:20 to 40:60. When the amount of VdF units is less than 40 % by weight, based on the total weight of VdF units and HFP units, the polymerization rate is extremely low and it is difficult to produce an elastomer of the desired molecular weight. When the amount of VdF units is more than 80 % by weight, based on the total weight of VdF units and HFP units, the elastomer produced is resinous and, therefore, poor in elasticity. In the case of a terpolymer, the amount of TFE units is not more than 35 % by weight, preferably 5 to 25 % by weight, based on the weight of the elastomer. When the amount of the TFE units is more than 35 % by weight, the elastomer produced is resinous and, therefore, poor in elasticity. It is preferred that the weight ratio of VdF units to HFP units be 55:45 to 75:25 in the case of the binary copolymer, and 45:55 to 70:30 in the case of a terpolymer.

Figure 4:
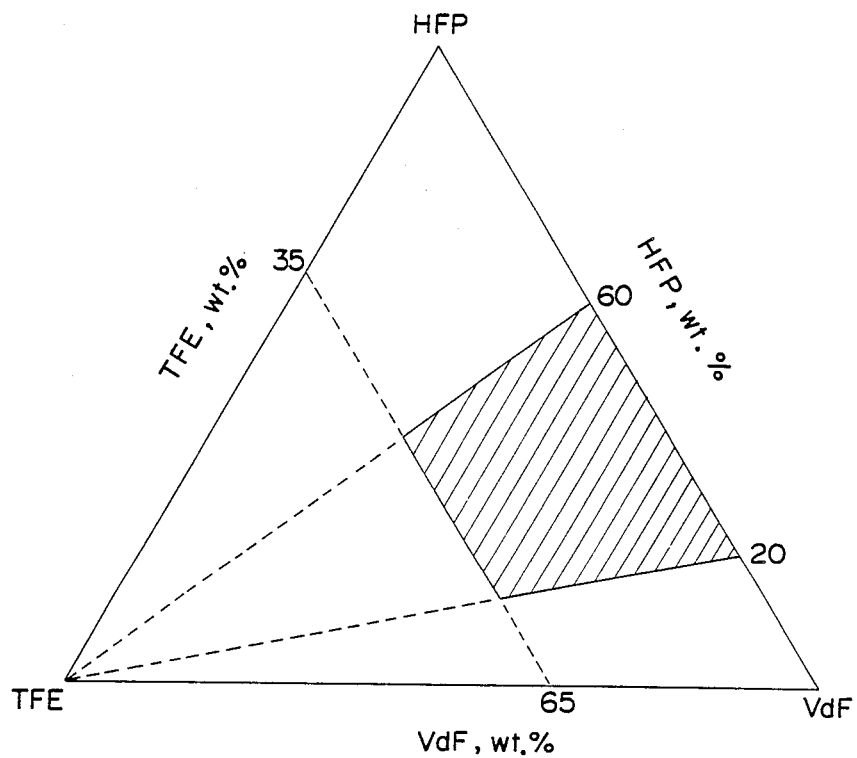
FIG. 4 is a triangular diagram showing the region of the present invention, which is defined by the proportions of VdF (wt.%), HFP (wt.%) and TFE (wt.%), the region of the present invention being indicated by hatching.

FIG. 4 is a triangular diagram showing the region of the present invention which is defined by the proportions (wt.%) of VdF units, HFP units and TFE units. In FIG. 4, the region of the present invention is indicated by hatching.

Hereinbelow, the method for producing the fluoroelastomer of the present invention is described. Conventionally, fluoroelastomers have generally been produced by emulsion polymerization. Sometimes, suspension polymerization, solution polymerization or the like has also been employed. However, for producing the fluoroelastomer of the present invention, it is preferred to employ suspension polymerization.

With respect to the suspension polymerization for producing a conventional fluoroelastomer, some methods have been proposed in, for example, U.S. Pat. No. 3,801,552. However, for producing the fluoroelastomer of the present invention, it is preferred to employ the following method. In an aqueous medium containing a suspension stabilizer is dispersed an inert organic solvent, in which a prescribed monomer mixture (starting monomer mixture) is dissolved. A catalyst is then added, followed by stirring while maintaining the temperature at 50° C. or more, preferably at from 50° to 80° C., more preferably at from 50° to 60° C. Subsequently, added thereto is a fresh monomer mixture (additional monomer mixture) to maintain the polymerization pressure at a predetermined level within the range of from 5 to 30 kg/cm²-G, preferably from 5 to 15 kg/cm²-G, and thereby advancing the reaction. There is no particular restriction with respect to the reaction time. However, the reaction time is generally in the range of from 5 to 50 hours. The proportions of the monomers in the additional monomer mixture are predetermined so that the proportions of the monomers are substantially in coincidence with the proportions of the monomer units in the resultant fluoroelastomer. The amount of the resultant fluoroelastomer is almost equal to the amount of the additional monomer mixture.

The proportions of the starting monomers and those of the additional monomers can be determined by gas chromatography (G.C.), and the proportions of the monomer units in the fluoroelastomer can be determined by dissolving the elastomer in acetone and subjecting the resultant solution to $^{19}$FNMR.

As the catalyst, a dialkyl peroxydicarbonate is preferably used in an amount of from 0.001 to 0.100 mole per kilogram (kg) of the polymer product to be formed. The whole amount of the catalyst is added at one time to the polymerization reaction system.

The dialkyl peroxydicarbonate to be used as a polymerization catalyst is represented by the formula:

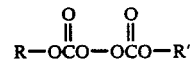

wherein each of R and R' represents an alkyl group having 1 to 10 carbon atoms.

Representative examples of dialkyl peroxydicarbonates include diisopropyl peroxydicarbonate, di-sec-butyl peroxydicarbonate, di-sec-amyl peroxydicarbonate, di-sec-hexyl peroxydicarbonate, di-n-propyl peroxydicarbonate and di-n-butyl peroxydicarbonate. Of these, diisopropyl peroxydicarbonate is most preferred.

Representative examples of inert organic solvents to be used in the suspension polymerization include an organic solvent which does not have a carbon-hydrogen linkage, such a linkage being disadvantageously likely to cause radical chain transfer. Of such solvents, 1,1,2-trichloro-1,2,2-trifluoroethane (Freon-113) is preferred from the viewpoint of performance and cost.

Representative examples of suspension stabilizers include methyl cellulose.

By this suspension polymerization method in the present invention, the desired polymer can be obtained in a yield as high as 2.6 to 8.0 kg per liter of Freon, which is remarkably higher than the yield attained by the conventional suspension polymerization method in which the yield is at most 1 kg per liter of Freon. In the above-mentioned method, the rate of the polymerization is high and the fluoroelastomer of the present invention can be produced in high yield while suppressing the formation of not only too high molecular weight polymers but also too low molecular weight polymers. The thus produced fluoroelastomer not only has excellent mold release characteristics and metal-adhesion properties, but has also excellent elasticity.

Further, it should be noted that when the fluoroelastomer obtained by the above-mentioned method is subjected to extrusion, the limiting viscosity number [η] of the fluoroelastomer is decreased while the $H_5/H_{20}$ ratio exhibits almost no change. Therefore, when a fluoroelastomer having a limiting viscosity number [η] higher than the desired value by 10 to 30 ml/g and having the desired $H_5/H_{20}$ ratio is extruded using an extruder, a fluoroelastomer having the desired limiting viscosity number and $H_5/H_{20}$ ratio can efficiently be obtained. The types of extruders are not limited, and any customary extruder may be employed as long as it is of a heating type and is capable of exerting shearing stress. This extrusion treatment will be described hereinunder by taking as an example the case where a twin extruder is used. When the present fluoroelastomer is extruded by means of a twin extruder having a screw diameter of 44 mm and having at least one seal ring at a barrel temperature of from 140° to 280° C., a revolution number of screws of from 120 to 400 rpm and an extrusion rate of from 20 to 50 kg/Hr, the temperature of the fluorine-containing elastomer becomes 200° to 300° C. The limiting viscosity number [η] of the fluoro-elastomer thus extruded decreases while the $H_5/H_{20}$ ratio exhibits almost no change. Thus, a fluoroelastomer having the desired limiting viscosity number [η] and $H_5/H_{20}$ can be obtained.

The fluoroelastomer of the present invention can be vulcanized by means of a polyamine, polyol or the like, and vulcanization thereof by means of a polyol particularly allows the fluoroelastomer to remarkably exert its improved properties.

Hereinbelow, the vulcanizaation method using a polyol is described.

To the fluoroelastomer are added an acid binder, a polyol, a vulcanization accelerator and, if desired, a filler, followed by kneading. Subsequently, the kneaded mixture is heated to effect vulcanization.

Representative examples of acid binders include an oxide or hydroxide of a bivalent metal, such as an oxide or hydroxide of magnesium, calcium, zinc or lead. The amount of the binder to be used is in the range of 1 to 30 parts by weight, preferably 2 to 20 parts by weight per 100 parts by weight of the elastomer.

Representative examples of polyols include hydroquinone, 2,2-bis(4-hydroxyphenyl)propane-(bisphenol A), 2,2-bis(4-hydroxyphenyl)perfluoro-propane(bisphenol AF), 4,4'-dihydroxydiphenyl ether, 4,4'-dihydroxydiphenylmethane, and 2,2-bis(4-hydroxyphenyl)-butane. The amount of the polyol to be used is 0.1 to 10 parts by weight, preferably 0.6 to 5 parts by weight per 100 parts by weight of the elastomer.

With respect to polyamines, an explanation will be described later.

Representative examples of vulcanization accelerators include a quaternary onium salt, a quaternary phosphonium salt, a quaternary ammonium salt and iminium salt, such as tetramethylammonium chloride, tetraethylammonium chloride, tetrapropylammonium chloride, tetrabutylammonium chloride, tetrabutylammonium bromide, bis(benzyldiphenylphosphine) iminium chloride, tetrabutylphosphonium chloride, benzyltriphenylphosphonium chloride and benzyltrioctylphosphonium chloride. The amount of the vulcanization accelerator is 0.05 to 2 parts by weight, preferably 0.1 to 1 part by weight per 100 parts by weight of the elastomer.

As a filler, for example, reinforcing agent, such as carbon black, silica, clay, talc or the like may be employed depending on the use.

In general, a mixture of the fluoroelastomer, an acid binder, a polyol, a vulcanization accelerator and, if desired, a filler is kneaded by means of rolls or a Banbury mixer, and subjected to a primary vulcanization in a metal mold under pressure and then to a secondary vulcanization. Generally, the primary vulcanization is effected at 100° to 200° C. for 10 to 180 min under 20 to 100 kg/cm$^2$-G and the secondary vulcanization is effected at 150° to 300° C. for several minutes to 30 hours. Optionally, the secondary vulcanization may be omitted.

The vulcanized elastomer obtained by the above-mentioned vulcanization has a low 100% modulus, a low hardness, a high tensile strength at break, a high tensile elongation at break and a low compression set. Therefore, the vulcanized elastomer has excellent elastomeric properties.

When the fluoroelastomer of the present invention is subjected to vulcanization, the fluoroelastomer exhibits almost no mill shrinkage. Further, since its Mooney viscosity $ML_{1+10}(121°$ C.) is in the range of from about 20 to about 100, the fluoroelastomer has good melt flowability. Hence, in compression molding, the fluoroelastomer exhibits not only excellent processability even if a mold having a mold cavity of complicated configuration is used, but also less flash.

By the vulcanization, there can be obtained, for example, a heat-fixing roll; a control valve; a diaphragm; shaped packings, such as O-ring, V-packing, U-packing, Y-packing, D-ring, triangular ring, T-ring and X-ring; a gasket; a rubber valve seat type butterfly valve; a stem valve; an oil seal; a shaped article for use with SF class engine oil; a fuel hose; a heat-shrinkable tubing; a wet friction material; a wire coating; a piezoelectric material; and bellows for smoke duct joint.

In the use of the elastomer as a diaphragm, an elongation is required rather than a compression set resistance and, therefore, vulcanization by means of a polyamine is effective in molding the fluoroelastomer of the present invention. The above-mentioned conditions for vulcanization by means of a polyol may apply to this vulcanization by means of a polyamine. In effecting the vulcanization by means of a polyamine, the following formulation may be employed.

The formulation may comprise 100 parts by weight of the elastomer, 0.3 to 5 parts by weight, preferably 0.5 to 4 parts by weight of a polyamine such as hexamethylenediamine carbamate and 1 to 30 parts by weight, preferably 5 to 20 parts by weight of an oxide or hydroxide of a bivalent metal.

With respect to the fluoroelastomer of the present invention, the measuring conditions for the limiting viscosity number, the molecular weight distribution ($\overline{M}w/\overline{M}n$ and $H_5/H_{20}$ ratio) and the (Y)/(X) ratio as well as the standard conditions for the vulcanization by means of a polyol are shown as follows.

(1) Limiting viscosity number

A 0.1 g/100 ml solution of the elastomer in methyl ethyl ketone is subjected to viscosity measurement using a capillary viscometer at 35° C.

(2) $\overline{M}/\overline{M}n$ and $H_5/H_{20}$ ratio

Gel permeation chromatography: LC-3A (manufactured and sold by Shimadzu Corp., Japan)

Columns KF-80M (two) +KF-800P (precolumn)- (manufactured and sold by Showa Denko K.K., Japan)

Detector: ERC-7510S (manufactured and sold by ELMA Optical Works, Ltd., Japan)

Integrator: 7000A (manufactured and sold by System Instruments Co., Ltd., Japan)

Developer: tetrahydrofurane

Concentration: 0.1% by weight

Temperature: 35° C.

Standard polymer for molecular weight calibration: various monodisperse polystyrenes (manufactured and sold by Toyo Soda Mfg Co., Ltd., Japan) ($\overline{M}/\overline{M}=1.2(max)$)

(Note): $\overline{M}/\overline{M}$ and $H_5/H_{20}$ ratio are calculated from the results of the above measurements.

(3) (Y)/(X) ratio

The elastomer is heat pressed at 230° C. to obtain a film having a thickness of about 70 μm. Using the film, an infrared absorption spectrum is obtained. From the spectrum, absorbance (Y) at a wave number of 1,760 cm$^{-1}$ and absorbance (X) at a wave number of 3,050 cm$^{-1}$ are obtained. Then, the ratio of absorbance (Y) to absorbance (X), i.e., (Y)/(X) ratio is calculated.

(4) Standard conditions for the vulcanization by means of a polyol

Fluoroelastomer: 100 parts by weight
Highly activated magnesium oxide: 3 parts by weight
Calcium hydroxide: 6 parts by weight
Bisphenol AF: 2 parts by weight
Bis(benzyldiphenylphosphine)iminium chloride: 0.3 part by weight
Medium thermal carbon: 30 parts by weight Means for kneading: rolls Primary heat press vulcanization: 177° C., 15 min (with respect to a fluoroelastomer comprising VdF units and HEP units) 177° C., 30 min (with respect to a fluoroelastomer comprising VdF units, HFP units and TFE units)

Secondary oven vulcanization: 232° C., 24 hours

With respect to the polyol-vulcanized elastomer, mechanical properties are measured as follows.

(5) 100% Modulus, tensile strength at break and tensile elongation at break

No. 3 dumbbell specimens blanked out from a 2 mm-thick sheet of vulcanized elastomer were subjected to measurement using a tensile machine (manufactured by Toyo Seiki Co., Ltd., Japan) at a pulling rate of 50 cm/min according to the method of JIS-K6301.

(6) Compression set

With respect to the measurement of the compression set, substantially in accordance with the method of JIS-K6301, polyol-vulcanized P-24 type O-rings were compressed so that the thickness thereof decreases by 25% and kept at 200° C. for 72 hours and then allowed to cool at room temperature for 30 min, followed by measurement using a thickness meter (manufactured by Kyoto Kobunshi Keiki Co., Ltd., Japan).

With respect to the processability during the vulcanization, i.e., roll processability, mold release characteristics and metal-adhesion properties, the evaluation criteria are shown as follows.

(7) Roll processability

Roll kneading is conducted under the conditions as mentioned in above item (4). For evaluation of roll processability, adhesion of the elastomer to the rolls, for example, whether or not the tearing of the elastomer into two portions, which respectively strongly adhere to the front roll and the back roll, occurs; easiness in intermixing additives for vulcanization as listed in item (4) with the elastomer and appearance of the surfaces of a sheet obtained from the kneaded mixture are observed. Processability during the vulcanization is evaluated based on the following criteria.

O: excellent, Δ: medium, X: poor (8) Mold release characteristics

Using a mold, the primary heat press vulcanization is conducted under the conditions as mentioned in above item (4). Then, the resultant sheet having a thickness of 2 mm is released from the mold. The mold release characteristics are evaluated by the following criteria.

O: excellent, Δ: medium, X: poor (9) Metal-adhesion properties

To one surface of a SUS 304 steel sheet (50×15×1 mm), which surface has been abraded with #240 abrasive paper, is coated by brushing a vulcanized adhesive (Monicas QZR-48 manufactured and sold by Yokohama Kobunshi Kenkyujo, Japan). The adhesive is air-dried at room temperature for 30 minutes and then baked at 120° C. for 10 minutes. Thereafter, the unvulcanized fluoroelastomer is contacted with the surface of the SUS 304 steel sheet on which surface the adhesive is coated and baked, and press vulcanization is then conducted at 177° C. for 15 minutes, followed by heat treatment at 232° C. for 24 hours, thereby obtaining a test sheet. An attempt is made to peel off the elastomer of the test sheet at a peel angle of 90° C. using a pair of pincers. When the elastomer is broken, an attempt is again made to peel off the elastomer at another position in the test sheet in substantially the same manner as described above. The metal-adhesion properties are evaluated by the following criteria.

O: The elastomer has been strongly adhered to the surface of the steel sheet and part of the vulcanized elastomer is torn-off and left over the entire surface of the steel sheet when an attempt is made to peel off the vulcanized elastomer.

Δ: Part of the vulcanized elastomer is torn-off and left over almost the entire surface of the steel sheet when an attempt is made to peel off the vulcanized elastomer.

X: The vulcanized elastomer is completely peeled off.

PREFERRED EMBODIMENT OF THE INVENTION

The present invention will be described in more detail with reference to the Examples, which should not be construed to be limiting the scope of the present invention.

EXAMPLE 1

The air in an autoclave having a capacity of about 15 liters which is provided with an electromagnetic stirrer is completely replaced by nitrogen gas, and an evacuation-$N_2$ filling cycle is repeated 3 times. After the nitrogen replacement, under reduced pressure, the autoclave is charged with 5400 g of degassed purified water, 1070 g of 1,1,2- trichloro-1,2,2-trifluoroethane (hereinafter referred to as "Freon-113") and 5.4 g of methylcellulose (viscosity 50cp) as a suspension stabilizer, followed by stirring at 500 rpm while maintaining the temperature at 50° C. Subsequently, a monomer mixture is charged as a charge gas, which consists of 29.6% by weight of VdF and 70.4% by weight of HFP, until a pressure of 10 kg/cm$^2$-G is attained. Then, 122 g of a Freon-113 solution containing 10.5% by weight of diisopropyl peroxydicarbonate is introduced as a catalyst to thereby start the polymerization. As the polymerization proceeds, the pressure decreases to 9.5 kg/cm$^2$-G. Then, a monomer mixture consisting of 62.9% by weight of VdF and 37.1% by weight of HFP is added as an additional gas, thereby to bring the pressure back to 10 kg/cm$^2$-G. By repeating this operation, the polymerization reaction is performed for 11.6 hours. After completion of the polymerization reaction, the remaining monomer mixture is discharged. The obtained suspension is subjected to centrifugation to remove water. The resultant solid is thoroughly washed with water and then subjected to vacuum drying at 100° C. to obtain about 3.7 kg of the desired elastomer in a sheet form. The obtained fluoroelastomer is subjected to $^{19}$FNMR analysis to find that the elastomer consists of 63.6% by weight of VdF units and 36.4% by weight of HFP units.

With respect to the thus obtained fluoroelastomer, the limiting viscosity number [η] is 92 ml/g, the number average molecular weight ($\overline{M}$) is 7.4×10$^4$, $\overline{M}/\overline{M}$ is 3.2, $H_5/H_{20}$ is 0.55, Mooney viscosity $ML_{1+10}$ (121° C.) is 47 and (Y)/(X), which is the ratio of absorbance (Y) at a wave number of 1,760 cm$^{-1}$ to absorbance (X) at a wave number of 3,050 cm$^{-1}$ in the infrared absorption spectrum, is 0.20. The infrared absorption spectrum of the fluoroelastomer is shown in FIG. 2.

Then, the fluoroelastomer is subjected to polyol vulcanization under the standard conditions, thereby obtaining a vulcanized rubber having excellent mechanical properties and having excellent processability, i.e., excellent roll processability, mold release characteristics and metal-adhesion properties. Processability during the vulcanization and properties of the vulcanized rubber are shown in Table 2.

EXAMPLES 2 TO 6 AND COMPARATIVE EXAMPLE 1

Polymerizations are individually effected in substantially the same manner as in Example 1 except that the polymerization conditions are as indicated in Table 1 at its column entitled "polymerization conditions" to obtain fluoroelastomers. Then, each of the fluoroelastomers is vulcanized under the same conditions as in Example 1 to obtain a vulcanized rubber. Properties of the fluoroelastomers, processability during the vulcanizations and properties of the vulcanized rubber are shown in Table 2.

TABLE 1

| | polymerization conditions | | | | | | | | results of polymerization amount of obtained elastomer (kg) |
|---|---|---|---|---|---|---|---|---|---|
| | composition of starting monomer mixture VdF HFP TFE (weight %) | composition of additional monomer mixture VdF HFP TFE (weight %) | polymerization pressure (kg/cm$^2$ · G) | amount of purified water (g) | amount of Freon-113*[1] (g) | amount of methylcellulose (g) | amount of catalyst*[2] (g) | polymerization time (Hr) | |
| Example 2 | 30.0<br>70.0<br>— | 62.7<br>37.3<br>— | 10–9.5 | 5,400 | 1,070 | 5.4 | 122 | 10 | 2.8 |
| Example 3 | 29.1<br>70.9<br>— | 71.2<br>28.8<br>— | 10–9.5 | 5,400 | 1,070 | 5.4 | 122 | 11.5 | 3.9 |
| Example 4 | 30.0<br>70.0<br>— | 62.7<br>37.3<br>— | 10–9.5 | 5,400 | 1,070 | 5.4 | 122 | 8.5 | 2.0 |
| Example 5 | 29.7<br>70.3<br>— | 62.8<br>37.2<br>— | 10–9.5 | 5,400 | 1,060 | 5.4 | 121 | 10.8 | 4.2 |
| Example 6 | 29.9<br>70.1<br>— | 62.9<br>37.1<br>— | 10–9.5 | 4,760 | 2,140 | 4.8 | 204 | 7 | 2.6 |
| Comparative Example 1 | 29.8<br>70.2<br>— | 62.8<br>37.2<br>— | 12–11.5 | 5,400 | 1,070 | 5.4 | 82 | 10.3 | 3.3 |

Note:
*[1]This amount does not include the amount of Freon-113 contained in the catalyst solution.
*[2]In terms of the total weight (g) of a catalyst solution (solution of 10.5% by weight of diisopropyl peroxydicarbonate in Freon-113).

TABLE 2

| | composition of elastomer VdF HFP TFE (wt %) | limiting viscosity number (ml/g) | $\overline{MN}$ ($\times 10^4$) | $\overline{Mw}/\overline{Mn}$ | $H_5/H_{20}$ | $(Y)/(X)^1$ | Mooney viscosity $ML_{1+10}$ (121° C.) | roll process-ability | mold release characteristics | metal-adhesion properties | hardness JIS-A | 100% modulus (kgf/cm²) | tensile strength at break (kgf/cm²) | tensile elongation at break (%) | compression set (%) |
|---|---|---|---|---|---|---|---|---|---|---|---|---|---|---|---|
| Example 1 | 63.6 36.4 — | 92 | 7.4 | 3.2 | 0.55 | 0.20 | 47 | ○ | ○ | ○ | 77 | 46 | 151 | 235 | 19 |
| Example 2 | 62.5 37.5 — | 83 | 6.3 | 3.5 | 0.56 | 0.23 | 30 | ○ | ○ | ○ | 81 | 56 | 134 | 200 | 23 |
| Example 3 | 69.8 30.2 — | 94 | 6.4 | 3.3 | 0.60 | 0.18 | 47 | ○ | ○ | ○ | 76 | 49 | 165 | 255 | 21 |
| Example 4 | 63.0 37.0 — | 72 | 6.0 | 3.0 | 0.67 | 0.26 | 25 | ○ | ○ | ○ | 80 | 50 | 130 | 220 | 25 |
| Example 5 | 63.1 36.9 — | 93 | 7.2 | 3.4 | 0.50 | 0.20 | 50 | ○ | ○ | ○ | 79 | 55 | 168 | 235 | 18 |
| Example 6 | 62.3 37.7 — | 61 | 5.7 | 2.5 | 0.97 | 0.31 | 20 | ○ | ○ | ○ | 80 | 48 | 135 | 240 | 27 |
| Comparative Example 1 | 62.3 37.7 — | 118 | 10.7 | 3.4 | 0.45 | 0.12 | 84 | ○ | ○ | × | 79 | 50 | 148 | 230 | 17 |
| Comparative Example 2 | 63.2 36.8 — | 80 | 8.5 | 8.9 | 1.00 | less than 0.059 | 45 | ○ | × | △ | 81 | 60 | 170 | 230 | 25 |

Note:
$^1$ratio of absorbance (Y) at a wave number of 1,760 cm$^{-1}$ to absorbance (X) at a wave number of 3,050 cm$^{-1}$ in the infrared absorption spectrum

COMPARATIVE EXAMPLE 2

The air in an autoclave having a capacity of 15 liters which is provided with an electromagnetic stirrer is completely replaced by nitrogen gas, and an evacuation-$N_2$ filling cycle is repeated 3 times, followed by reducing the pressure to a level as low as possible. Subsequently, the autoclave is charged with 7500 g of degassed purified water, and 2.6 g of diethyl malonate, and maintained at 70° C. Then, a monomer mixture consisting of 53.4% by weight of VdF and 46.6% by weight of HFP is charged until a pressure of 8 kg/cm$^2$-G is attained. Then, a solution prepared by dissolving 37.5 g of ammonium persulfate as a catalyst in 100 g of purified water is introduced by injection to start the polymerization. As the polymerization proceeds, the pressure decreases to 7 kg/cm$^2$-G. Then, an additional monomer mixture consisting of 63.1% by weight of VdF, and 36.9% by weight of HFP is added, thereby to bring the pressure back to 8 kg/cm$^2$-G. By repeating this operation, the polymerization reaction is performed for 3.0 hour and, then, the remaining monomer mixture is discharged to terminate the polymerization.

To the obtained emulsion is added a magnesium chloride solution to salt out the polymer. The polymer is thoroughly washed with water and, then, subjected to vacuum drying at 80° C. to obtain about 2.7 kg of a fluoroelastomer. The fluoroelastomer is subjected to $^{19}$FNMR analysis to determine that the fluoroelastomer consists of 63.2% by weight of VdF units and 36.8% by weight of HFP.

With respect to the thus obtained fluoroelastomer, the limiting viscosity number [$\eta$] is 80 ml/g, the number average molecular weight ($\overline{M}$) is $8.5 \times 10^4$, $\overline{M}/\overline{M}$ is 8.9, $H_5/H_{20}$ is 1.00, Mooney viscosity $ML_{1+10}$ (121° C.) is 45 and (Y)/(X), which is the ratio of absorbance (Y) at a wave number of 1,760cm$^{-1}$ to absorbance (X) at a wave number of 3.050cm$^{-1}$ in the infrared absorption spectrum, is 0.059. The infrared absorption spectrum of the fluoroelastomer is shown in FIG. 3.

Then, the fluoroelastomer is subjected to polyol vulcanization under the standard conditions, thereby obtaining a vulcanized rubber having excellent mechanical properties and having excellent processability, i.e., excellent roll processability, mold release characteristics and metal-adhesion properties. Processability during the vulcanization and properties of the vulcanized rubber are shown in Table 2.

EXAMPLE 7

The air in an autoclave having a capacity of about 15 liters which is provided with an electromagnetic stirrer is completely replaced by nitrogen gas, and an evacuation-$N_2$ filling cycle is repeated 3 times. After the nitrogen replacement, under reduced pressure, the autoclave is charged with 4760 g of degassed purified water, 2140 g of Freon-113 and 4.8 g of methylcellulose (viscosity 50cp) as a suspension stabilizer, followed by stirring at 500 rpm while maintaining the temperature at 50 ° C. Subsequently, a monomer mixture is charged as a charge gas, which consists of 20.2% by weight of VdF, 74.3% by weight of HFP and 5.5% by weight of TFE, until a pressure of 10 kg/cm$^2$-G is attained. Then, 163 g of a Freon-113 solution containing 10.5% by weight of diisopropyl peroxydicarbonate as a catalyst is introduced to start the polymerization. As the polymerization proceeds, the pressure decreases to 9.5 kg/cm$^2$-G. Then, a monomer mixture consisting of 47.4% by weight of VdF and 31.6% by weight of HFP and 21.0% by weight of TFE is added as an additional gas, thereby to bring the pressure back to 10 kg/cm$^2$-G. By repeating this operation, the polymerization reaction is performed for 5.5 hours. After completion of the polymerization reaction, the remaining monomer mixture is discharged. The obtained suspension is subjected to centrifugation to remove water. The resultant solid is thoroughly washed with water and then subjected to vacuum drying at 100° C. to obtain about 4.0 kg of the desired elastomer in a sheet form. The obtained fluoroelastomer is subjected to $^{19}$FNMR analysis to find that the elastomer consists of 48.2% by weight of VdF units and 31.0% by weight of HFP units and 20.8% by weight of TFE units.

With respect to the thus obtained fluoroelastomer, the limiting viscosity number [$\eta$] is 89 ml/g, the number average molecular weight ($\overline{M}$) is $7.8 \times 10^4$, $\overline{M}/\overline{M}$ is 3.1, $H_5/H_{20}$ is 0.58, Mooney viscosity $ML_{1+10}$ (121° C.) is 67 and (Y)/(X), which is the ratio of absorbance (Y) at a wave number of 1,760 cm$^{-1}$ to absorbance (X) at a wave number of 3,050 cm$^{-1}$ in the infrared absorption spectrum, is 0.11.

Then, the fluoroelastomer is subjected to polyol vulcanization under the standard conditions, thereby obtaining a vulcanized rubber having excellent mechanical properties and having excellent processability, i.e., excellent roll processability, mold release characteristics and metal-adhesion properties. The properties of the vulcanized rubber are shown in Table 4.

Examples 8 to 13 and Comparative Example 3 and 4

Polymerizations are individually effected in substantially the same manner as in Example 7 except that the polymerization conditions are as indicated in Table 3 at its column entitled "polymerization conditions" to obtain fluoroelastomers. Then, each of the fluoroelastomers is vulcanized under the same conditions as in Example 1 to obtain a vulcanized rubber. Properties of the fluoroelastomers, processabilities in the vulcanization treatment and properties of the vulcanized rubbers are shown in Table 4.

TABLE 3

| | composition of starting monomer mixture VdF HFP TFE (weight %) | composition of additional monomer mixture VdF HFP TFE (weight %) | polymerization pressure (kg/cm$^2$ · G) | amount of purified water (g) | amount of Freon-113*[1] (g) | amount of methylcellulose (g) | amount of catalyst*[2] (g) | polymerization time (Hr) | result of polymerization amount of obtained elastomer (kg) |
|---|---|---|---|---|---|---|---|---|---|
| Example 8 | 18.9<br>75.9<br>5.2 | 47.5<br>31.6<br>20.9 | 12.0–11.5 | 4,760 | 2,140 | 4.8 | 163 | 4.3 | 4.3 |
| Example 9 | 8.6<br>86.6 | 41.0<br>39.2 | 12.0–11.5 | 5,440 | 1,060 | 5.4 | 112 | 8.5 | 3.6 |

TABLE 3-continued

| | composition of starting monomer mixture VdF HFP TFE (weight %) | composition of additional monomer mixture VdF HFP TFE (weight %) | polymerization pressure (kg/cm² · G) | amount of purified water (g) | amount of Freon-113[*1] (g) | amount of methylcellulose (g) | amount of catalyst[*2] (g) | polymerization time (Hr) | result of polymerization amount of obtained elastomer (kg) |
|---|---|---|---|---|---|---|---|---|---|
| Example 10 | 4.9<br>33.6<br>58.4 | 19.8<br>52.6<br>25.6 | 7.0–6.5 | 4,450 | 2,140 | 4.5 | 122 | 14.0 | 4.2 |
| Example 11 | 8.0<br>20.1<br>74.7 | 21.8<br>47.6<br>31.4 | 8.0–7.5 | 4,780 | 2,140 | 4.8 | 244 | 9.3 | 5.2 |
| Example 12 | 5.2<br>28.2<br>64.8 | 21.0<br>52.6<br>25.8 | 8.0–7.5 | 4,760 | 2,140 | 4.8 | 142 | 8.0 | 3.8 |
| Example 13 | 7.0<br>7.8<br>86.8 | 21.7<br>19.2<br>67.4 | 9.0–8.5 | 5,440 | 1,070 | 5.4 | 203 | 11 | 5.4 |
| Comparative Example 3 | 5.4<br>32.8<br>59.3<br>7.9 | 13.4<br>51.1<br>25.9<br>23.0 | 8.0–7.5 | 4,760 | 2,140 | 4.8 | 71 | 10.0 | 3.9 |
| Comparative Example 4 | 28.0<br>64.7<br>7.3 | 52.9<br>25.3<br>21.8 | 6.0–5.5 | 4,760 | 2,140 | 4.8 | 204 | 8.0 | 2.3 |

Note:
[*1] This amount does not include the amount of Freon-113 contained in the catalyst solution.
[*2] In terms of the total weight (g) of a catalyst solution (solution of 10.5% by weight of diisopropyl peroxydicarbonate in Freon-113).

Note: (1) This amount does not include the amount of Freon-113 contained in the catalyst solution. (2) In terms of the total weight (g) of a catalyst solution (solution of 10.5% by weight of diisopropyl peroxydicarbonate in Freon-113).

TABLE 4

| | composition of elastomer VdF HFP TFE (wt %) | properties of elastomer | | | | | Processability during vulcanization | | | | properties of vulcanized rubber | | | |
|---|---|---|---|---|---|---|---|---|---|---|---|---|---|---|
| | | limiting viscosity number (ml/g) | $\overline{M}_N$ ($\times 10^4$) | $\overline{M}_w/\overline{M}_n$ | $H_5/H_{20}$ | $(Y)/(X)^1$ | Mooney viscosity $ML_{1+10}$ (121° C.) | roll process-ability | mold release characteristics | metal-adhesion properties | hard-ness JIS-A | 100% modulus (kgf/cm$^2$) | tensile strength at break (kgf/cm$^2$) | tensile elongation at break (%) | compression set (%) |
| Example 7 | 48.2 31.0 20.8 | 89 | 7.8 | 3.1 | 0.58 | 0.11 | 67 | ○ | ○ | ○ | 78 | 46 | 153 | 250 | 25 |
| Example 8 | 47.0 32.8 20.2 | 100 | 8.6 | 3.3 | 0.51 | 0.08 | 84 | ○ | ○ | ○ | 79 | 45 | 161 | 285 | 23 |
| Example 9 | 40.4 40.6 19.0 | 84 | 11.4 | 2.7 | 0.51 | 0.06 | 96 | ○ | ○ | ○ | 78 | 47 | 169 | 260 | 26 |
| Example 10 | 53.3 25.2 21.5 | 82 | 9.1 | 2.2 | 0.53 | 0.14 | 36 | ○ | ○ | ○ | 76 | 58 | 177 | 235 | 23 |
| Example 11 | 46.9 34.5 18.6 | 74 | 7.0 | 2.4 | 0.68 | 0.13 | 29 | ○ | ○ | ○ | 82 | 53 | 157 | 270 | 26 |
| Example 12 | 53.5 25.0 21.5 | 98 | 9.0 | 2.8 | 0.54 | 0.10 | 64 | ○ | ○ | ○ | 77 | 50 | 170 | 250 | 21 |
| Example 13 | 41.2 39.3 19.5 | 61 | 6.5 | 2.7 | 0.84 | 0.10 | 41 | ○ | ○ | ○ | 84 | 50 | 159 | 270 | 30 |
| Comparative Example 3 | 53.1 24.6 22.3 | 119 | 11.8 | 2.7 | 0.41 | 0.07 | 92 | ○ | ○ | × | 77 | 49 | 168 | 265 | 19 |
| Comparative Example 4 | 52.9 25.5 21.6 | 59 | 5.3 | 2.3 | 1.13 | 0.25 | 10 | △ | × | ○ | 83 | 63 | 143 | 215 | 35 |

Note:
[1] ratio of absorbance (Y) at a wave number of 1,760 cm$^{-1}$ to absorbance (X) at a wave number of 3,050 cm$^{-1}$ in the infrared absorption spectrum

EXAMPLE 14

Substantially the same procedure as in Example 6 is repeated except that 5000 g of purified water, 1000 g of Freon-113 and 5 g of a suspension stabilizer are charged into an autoclave, followed by stirring at 500 rpm while keeping the temperature at 50 °C. Subsequently, a monomer mixture consisting of 5.6% by weight of VdF, 90.8% by weight of HFP and 3.6% by weight of TFE is introduced until the pressure becomes 15 kg/cm$^2$-G. 48 g of a Freon-113 solution containing 10.5% by weight of diisopropyl peroxydicarbonate is introduced as a catalyst to start the polymerization. As the polymerization proceeds, the pressure decreases to 14.5 kg/cm$^2$-G. Then, a mixed gas consisting of 39.2% by weight of VdF, 40.1% by weight of HFP and 20.7% by weight of TFE is added as an additional monomer, thereby to bring the pressure back to 15 kg/cm$^2$-G. By repeating this operation, the polymerization reaction is performed for 15 hours to obtain about 4 kg of the desired elastomer. The elastomer consists of 41.2% by weight of VdF units, 40.3% by weight of HFP units and 18.5% by weight of TFE units and the limiting viscosity number $[\eta]$ is 115 ml/g.

The thus obtained fluoroelastomer is subjected to extrusion under the below-described extrusion conditions using the below-described extruder. After cutting by a hot cutter, the elastomer is left to cool, thereby obtaining pellets of the elastomer.

[Extruder]

Manufactured by the Japan Steel Works, Ltd., Japan Model: TEX44PS-30AW-2V (twin-screw).

[Extrusion Conditions]

Temperature 170° C.
Revolution number of screws 300 rpm
Sample supply rate 30 kg/hr With respect to the pelletized fluoroelastomer, the limiting viscosity $[\eta]$ is 90, the number average molecular weight ($\overline{M}$) is 12.0×10$^4$, $\overline{M}/\overline{M}$ is 2.6, H$_5$/H$_{20}$ ratio is 0.40, (Y)/(X) ratio is 0.05, and the Mooney viscosity [ML$_{1+10}$ (121° C.)] is 100.

Then, the fluoroelastomer is subjected to polyol vulcanization under the standard conditions, thereby obtaining a vulcanized rubber having excellent mechanical properties and having excellent processability, i.e., excellent roll processability, mold release characteristics and metal-adhesion properties. Processability during the vulcanization and properties of the vulcanized rubber are shown in Table 5.

TABLE 5

| | processability during vulcanization | | | Properties of vulcanized rubber | | | |
|---|---|---|---|---|---|---|---|
| roll process-ability | mold release character-istics | metal-adhesion properties | hardness JIS-A | 100% modulus (kgf/cm$^2$) | tensile strength at break (kgf/cm$^2$) | tensile elongation at break (%) | compres-sion set (%) |
| ○ | ○ | ○ | 80 | 53 | 162 | 335 | 24 |

COMPARATIVE EXAMPLE 6

The air in an autoclave having a capacity of about 15 liters which is provided with an electromagnetic stirrer is completely replaced by nitrogen gas, and an evacuation-N$_2$ filling cycle is repeated 3 times, followed by reducing the pressure to a level as low as possible. Subsequently, the autoclave is charged with 7500 g of degassed purified water, 15 g of ammonium persulfate and, as an emulsifier, 22.5 g of ammonium perfluorooctanoate, and maintained at 85 °C. Then, a monomer mixture consisting of 38.3% by weight of VdF, 39.2% by weight of HFP and 22.5% by weight of TFE is charged until a pressure of 8 kg/cm$^2$-G is attained. As the polymerization proceeds, the pressure decreases to 7 kg/cm$^2$-G. Then, an additional monomer mixture consisting of 44.7% by weight of VdF, 31.6% by weight of HFP and 23.7% by weight of TFE is added, thereby to bring the pressure back to 8 kg/cm$^2$-G. By repeating this operation, the polymerization reaction is performed for 1 hour and, then, the remaining monomer mixture is discharged to terminate the polymerization.

To the obtained emulsion is added a magnesium chloride solution to salt out the polymer. The polymer is thoroughly washed with water and, then, subjected to vacuum drying at 100° C. to obtain about 1.3 kg of fluoroelastomer. The fluoroelastomer is subjected to $^{19}$FNMR analysis to determine that the fluoroelastomer consists of 45.8% by weight of VdF units, 32.7% by weight of HFP units and 21.5% by weight of TFE units.

With respect to the thus obtained fluoroelastomer, the limiting viscosity number $[\eta]$ is 84 ml/g, the number average molecular weight ($\overline{M}$) is 7.1×10$^4$, $\overline{M}/\overline{M}$ is 13.0, H$_5$/H$_{20}$ is 0.70, Mooney viscosity ML$_{1+10}$ (121° C.) is 62 and (Y)/(X), which is the ratio of absorbance (Y) at a wave number of 1,760 cm$^{-1}$ to absorbance (X) at a wave number of 3,050 cm$^{-1}$ in the infrared absorption spectrum, is less than 0.03.

Then, the fluoroelastomer is subjected to polyol vulcanization under the standard conditions, thereby obtaining a vulcanized rubber.

Processability during the vulcanization and properties of the vulcanized rubber are shown in Table 6.

TABLE 6

| | processability during vulcanization | | | Properties of vulcanized rubber | | | |
|---|---|---|---|---|---|---|---|
| roll process-ability | mold release character-istics | metal-adhesion properties | hardness JIS-A | 100% modulus (kgf/cm$^2$) | tensile strength at break (kgf/cm$^2$) | tensile elongation at break (%) | compres-sion set (%) |
| ○ | X | △ | 81 | 66 | 170 | 249 | 47 |

What is claimed is:

1. A fluoroelastomer comprising vinylidene fluoride units, hexafluoropropylene units and 35 to 0% by weight, based on the weight of the fluoroelastomer, of tetrafluoroethylene units, the total of said vinylidene fluoride units and said hexafluoropropylene units being 65 to 100% by weight based on the weight of the fluoroelastomer, the weight ratio of said vinylidene fluoride units to said hexafluoropropylene units being in the range of 80:20 to 40:60, wherein:

(a) the limiting viscosity number (ml/g) of the fluoroelastomer is in the range of from 60 to 100, (b) the ratio of the weight average molecular weight ($\overline{Mw}$) of the fluoroelastomer to the number average molecular weight ($\overline{M}$) of the fluoroelastomer is in the range of from 2 to 4, and (c) the limiting viscosity number of the fluoroelastomer and the ratio of $H_5$ to $H_{20}$ of the fluoroelastomer, wherein $H_5$ and $H_{20}$ respectively represent the heights at molecular weights of 50,000 and 200,000 of the molecular weight distribution curve obtained by gel permeation chromatography, satisfy a requirement such that a point defined by the limiting viscosity number and the $H_5/H_{20}$ ratio in the rectangular coordinates where the limiting viscosity number is an abscissa and the $H_5/H_{20}$ ratio is an ordinate, is within the region defined by the quadrilateral formed by successively connecting points A(60, 1.0), B(60, 0.35), C(100, 0.2) and D(100, 0.55) in the coordinates.

2. The fluoroelastomer according to claim 1, wherein said limiting viscosity number and said ratio of $H_5$ to $H_{20}$ satisfy a requirement such that a point defined by the limiting viscosity number and the $H_5/H_{20}$ ratio in the rectangular coordinates where the limiting viscosity number is an abscissa and the $H_5/H_{20}$ ratio is an ordinate, is within the region defined by the quadrilateral formed by successively connecting points A'(60, 0.90), B'(60, 0.45), C'(100, 0.33) and D'(100, 0.55) in the coordinates.

3. The fluoroelastomer according to claim 1, wherein the total amount of said vinylidene fluoride units and said hexafluoropropylene units is 100% by weight, based on the weight of the fluoroelastomer and the weight ratio of said vinylidene fluoride units to said hexafluoropropylene units is in the range of from 75:25 to 55:45.

4. The fluoroelastomer according to claim 1, wherein the amount of said tetrafluoroethylene units is 5 to 25% by weight, based on the weight of the fluoroelastomer and the total amount of said vinylidene fluoride units and said hexafluoropropylene units is 75 to 95% by weight, based on the weight of the fluoroelastomer, the weight ratio of said vinylidene fluoride units to said hexafluoropropylene units being from 70:30 to 45:55.

5. The fluoroelastomer according to claim 1, wherein the infrared absorption spectrum of the fluoroelastomer exhibits peaks at wave numbers of 1,720 $cm^{-1}$, 1,760 $cm^{-1}$ and 1,800 $cm^{-1}$.

* * * * *